United States Patent [19]
Tapp

[11] Patent Number: 5,184,714
[45] Date of Patent: Feb. 9, 1993

[54] CENTRIFUGAL THROWER APPARATUS

[75] Inventor: Allan G. Tapp, Marmora, Canada

[73] Assignee: Svedala Industries Canada, Inc., Belleville, Canada

[21] Appl. No.: 843,890

[22] Filed: Feb. 27, 1992

[51] Int. Cl.⁵ ............................................. B65G 31/00
[52] U.S. Cl. ................................ 198/641; 414/140.2; 414/140.9; 414/300
[58] Field of Search ...................... 198/641; 414/140.2, 414/140.9, 300, 301

[56] References Cited

U.S. PATENT DOCUMENTS

| | | |
|---|---|---|
| Re. 24,113 | 1/1956 | Landrey . |
| 1,323,244 | 12/1919 | Blyth . |
| 2,125,088 | 7/1938 | Sinden . |
| 2,687,798 | 8/1954 | Landrey . |
| 2,781,892 | 2/1957 | Thevenieau . |
| 2,950,808 | 8/1960 | Gerberich . |
| 2,950,809 | 8/1960 | Sinden . |
| 3,039,594 | 6/1962 | Lucas . |
| 3,136,405 | 6/1964 | Kulla . |
| 3,179,235 | 4/1965 | Lucas . |
| 4,144,962 | 3/1979 | Ide . |

OTHER PUBLICATIONS

"Ship Trimmers," Boliden Allis, Stephens-Adamson.
Catalogue C-460, "Centrifugal Thrower Units," Stephens-Adamson.

*Primary Examiner*—Joseph E. Valenza
*Attorney, Agent, or Firm*—Nils H. Ljungman and Associates

[57] ABSTRACT

A centrifugal thrower apparatus, which may be used on swivelloaders, swivelpilers, box car loaders, pilers, ship trimmers and the like, capable of maintaining a substantially constant belt tension over a wide range of angles of discharge. Preferably, a cam is provided to continually adjust the distance between the two sets of pulleys on which the belt is mounted, such that constant or substantially constant belt tension is maintained for different angles of discharge.

20 Claims, 8 Drawing Sheets

BELT DOWN 30°

BELT DOWN 30°

FIG. 4

BELT UP 30°

FIG. 5

BYPASS MODE

FIG. 6

VESSEL AT HIGH TIDE

FIG. 7

VESSELS AT LOW TIDE
LAST HOLD TO BE FILLED

FIG. 8

FILLING TOP CORNERS

CENTRIFUGAL THROWER APPARATUS

BACKGROUND OF THE INVENTION

1. Field of the Invention

The present invention relates primarily to centrifugal throwers, which may be used on swivelloaders, swivelpilers, box car loaders, pilers, ship trimmers and the like.

2. Background Information

Generally, centrifugal throwers provide the function of delivering a large quantity of loose material, such as wood chips or other particulate or granular material, into a large container, such as the cargo hold of a vessel, and ensuring that the material is distributed substantially evenly throughout substantially the entire container. The basic components of typical centrifugal throwers are outlined in the following publications of Stephens-Adamson, Inc.: "Ship Trimmers" and Catalogue C-460, entitled "Centrifugal Thrower Units". As shown in those publications, a centrifugal thrower typically includes a chute structure for receiving material from another source and a belt unit, with an endless belt carried by a pair of spaced drums or pulleys. The chute is generally configured to feed material downwardly to the belt unit. Because material fed in this manner typically falls a considerable distance prior to reaching the belt, it typically reaches the belt at a considerable velocity.

Idler discs engaging with the moving belt form a curved pathway for the material to follow. The curved pathway essentially allows for the high velocity of the delivered material to be retained; in this manner, little, if any additional velocity generally needs to be imparted by the belt. Thus, because of the high discharge velocity, the delivered material can be thrown a substantial distance.

Centrifugal throwers, especially ship trimmers, may also include a bypass chute, branching off from the main chute, to allow delivered material to bypass the belt unit and be delivered generally directly downwardly. Generally, in such circumstances, the belt unit of the thrower apparatus is shut off.

Several U.S. patents disclose known centrifugal throwers capable of adjusting the angle of throw, or the initial angle at which material is discharged from the belt. For example, U.S. Pat. No. 3,136,405 to Kulla discloses a bulk material loading and trimming machine in which, apparently, the trajectory of discharged material can be adjusted during operation. U.S. Pat. No. 3,039,594 to Lucas discloses an apparatus for throwing discrete substances, such as sugar, grain and the like, in which the position of the discharge pulley, or the pulley at which material is discharged from the belt, can be adjusted in order to change the angle of trajectory of the material being thrown. Additionally, U.S. Pat. No. 3,179,235, also to Lucas, shows a type of trimming apparatus in which it is also possible to adjust the angle of trajectory of discharged material.

U.S. Pat. No. 4,144,962 to Ide shows a loading trimmer in which the attitude of the entire belt unit, including the pulleys, is adjustable. Thus, the entire structure of belts and pulleys, and the belt motor, undergoes a rocking motion about the idler discs. However, because the entire belt unit, including both sets of pulleys, and the belt motor needs to be displaced, a potentially costly driving system for affording such displacement is usually needed. Also, a problem encountered here, as well as with other known devices, is that the range of angles of trajectory afforded thereby may not be as great as is desired for the application at hand.

OBJECT OF THE INVENTION

It is an object of the present invention to overcome several disadvantages heretofore encountered with known centrifugal throwers. Particularly, it is an object of the present invention to provide a centrifugal thrower apparatus capable of maintaining constant or substantially constant belt tension for substantially large changes in angle of discharge.

SUMMARY OF THE INVENTION

In accordance with the present invention, the tension on the belt is maintained substantially constant for very large changes in angle of discharge.

One aspect of the invention resides broadly in centrifugal thrower apparatus for delivering loose material, the centrifugal thrower apparatus including frame means and chute means mounted on the frame means, the centrifugal thrower apparatus comprising: first pulley means being rotatably mounted on the frame means; second pulley means; means for supporting the second pulley means, the second pulley means being rotatably mounted on the means for supporting the second pulley means; the means for supporting the second pulley means being displaceably mounted on the frame means; means for solely displacing the means for supporting the second pulley means; belt means being mounted between the first pulley means and the second pulley means; means for driving the belt means; the belt means for receiving material from the chute means and discharging the material in the vicinity of the second pulley means; the means for supporting the second pulley means being displaceable to discharge the delivered material from the belt means at a plurality of angles; and means for maintaining constant tension on the belt means over a plurality of angles of discharge.

Another aspect of the invention resides broadly in centrifugal thrower apparatus for delivering loose material, the centrifugal thrower apparatus including frame means and chute means mounted on the frame means, the centrifugal thrower apparatus comprising: first pulley means; second pulley means; means for supporting the first pulley means, the first pulley means being rotatably mounted on the means for supporting the first pulley means; means for supporting the second pulley means, the second pulley means being rotatably mounted on the means for supporting the second pulley means; belt means being mounted between the first pulley means and the second pulley means; means for driving the belt means; the belt means for receiving material from the chute means and discharging the material in the vicinity of the second pulley means; means for displacing at least one of: the means for supporting the first pulley means; and the means for supporting the second pulley means; the at least one of the means for supporting the first pulley means and the means for supporting the second pulley means being displaceable to define an angle of discharge of the delivered material from the belt means; cam follower means being connected to the at least one of the means for supporting the first pulley means and the means for supporting the second pulley means; and cam means for engaging the cam follower means, the cam means being configured for maintaining substantially constant tension on the belt means over a plurality of angles of discharge.

Yet another aspect of the invention resides broadly in centrifugal thrower apparatus for delivering loose material, the centrifugal thrower apparatus including frame means and chute means mounted on the frame means, the centrifugal thrower apparatus comprising: first pulley means being rotatably mounted on the frame means; second pulley means; means for supporting the second pulley means, the second pulley means being rotatably mounted on the means for supporting the second pulley means; the means for supporting the second pulley means being displaceably mounted on the frame means; means for displacing the means for supporting the second pulley means; belt means being mounted between the first pulley means and the second pulley means; means for driving the belt means; the belt means for receiving material from the chute means and discharging the material in the vicinity of the second pulley means; the means for supporting the second pulley means being displaceable to discharge the delivered material from the belt means at a plurality of angles; and means for maintaining constant tension on the belt means over a plurality of substantially different angles of discharge.

BRIEF DESCRIPTION OF THE DRAWINGS

The preferred embodiments according to the present invention will now be described in greater detail with reference to the accompanying drawings, wherein.

DESCRIPTION OF THE PREFERRED EMBODIMENTS

Figure 1:
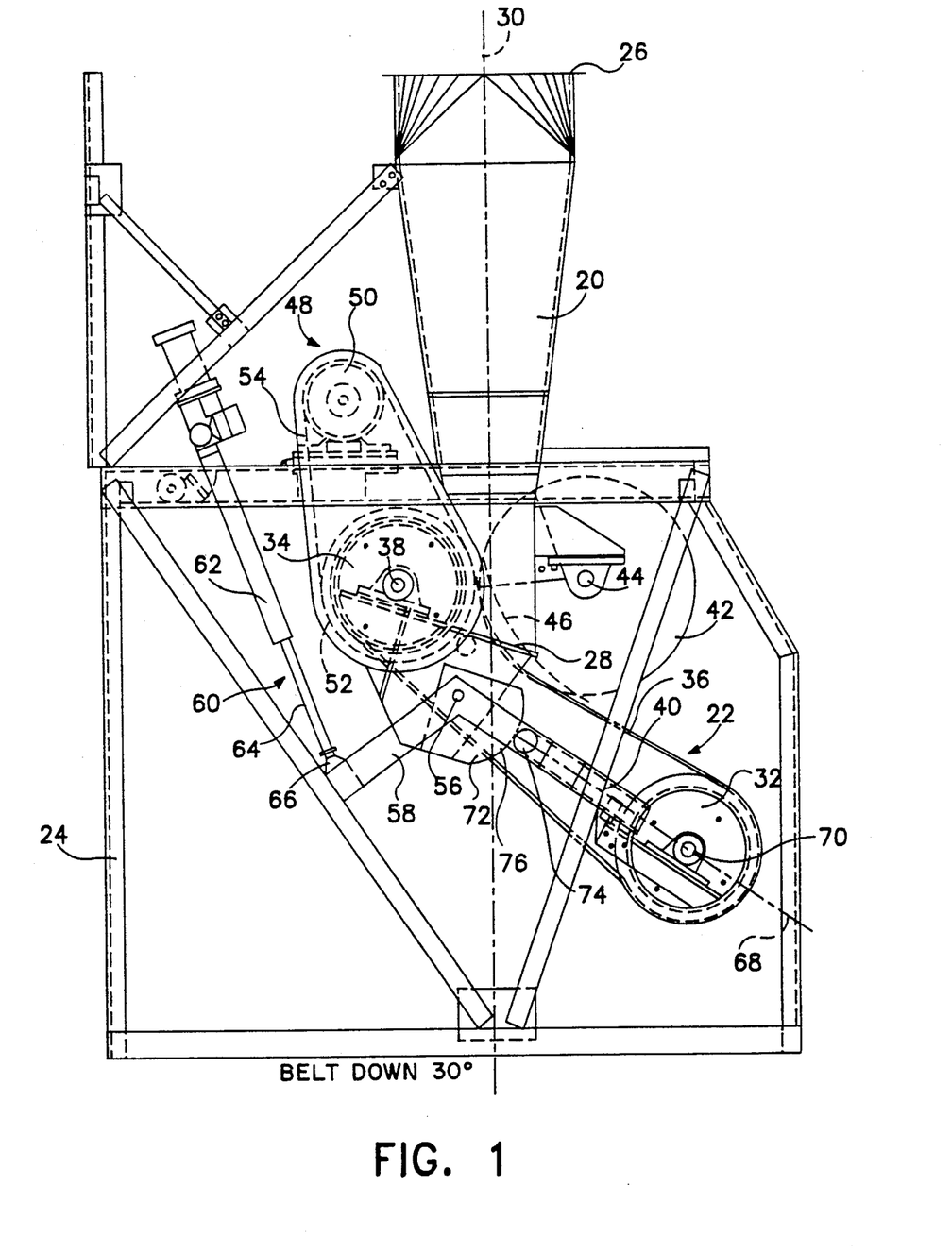
FIG. 1 is a side elevational view of a centrifugal thrower apparatus according to the present invention, with a belt of the thrower apparatus being oriented in a lower position.

Essentially, the present invention is embodied by a chute or funnel 20 and thrower apparatus 22 mounted on a main frame 24, as shown in FIG. 1. An upper, open end 26 of the chute 20 is preferably configured to receive material from a loading chute or other delivery conduit (not shown). The material is then directed through the chute 20 to the thrower apparatus 22, and thence to a cargo hold or other large container. Accordingly, the chute 20 preferably has a lower open end 28 configured for optimal delivery of material from the chute 20 to the thrower apparatus 22. As an example, upper end 26 of the chute 20 may have a generally circular cross-section and lower end 28 of the chute may have a generally rectilinear cross-section. Also, as shown in FIG. 1, the lower end 28 of the chute may be sloped. The chute 20 is preferably rigidly fixed to the frame 24 and oriented along a vertical axis 30 with respect to the main frame 24.

The thrower apparatus 22 includes a pair of spaced pulleys 32 and 34 which carry an endless belt 36. Preferably, pulley 34, hereinafter referred to as the "drive pulley", is rotatably mounted on the frame 24 about point 38, whilst pulley 32, hereinafter referred to as the "discharge pulley," is rotatably mounted on its own frame 40, which itself is mounted on frame 24 in a manner described more fully below. The pulleys 32 and 34 may be in the form of drums or may comprise sets of parallelly disposed pulleys.

A set of parallel idler discs 42, preferably two in number, are preferably rotatably mounted on the frame 24 about a common shaft 44. The idler discs 42 are preferably configured to engage with the belt 36 to form a curved pathway 46 which receives the material from chute 20. Also, preferably, the idler discs 42 are disposed towards opposite edges of the belt 36 so as to only minimally interfere with the delivered material.

Thus, the overall configuration of the centrifugal thrower is such that the material is thrown from the belt 36, at the discharge pulley 32, at a predetermined angle of discharge. The drive pulley 34 is preferably driven by means of a belt drive assembly 48. Preferably included in belt drive assembly 48 are: a drive motor 50 fixably mounted to the main frame 24; a driven drum 52 axially connected to drive pulley 34; and a drive shaft sheave 54 carried by the drive motor 50 and the drum 52. Any of several types of motors may be used for the drive motor 50 including, for example, an explosion-proof, 75 horsepower drive motor, CEMA design "B".

Preferably, pivotally mounted about a pin 56 on each side of frame 24 is a pivot arm 58. Each pivot arm 58 is preferably dogleg-shaped, with the "elbow" preferably forming an obtuse angle. Also, the elbow of each pivot arm 58 is preferably mounted at the pin 56. It should be understood that, preferably, two pivot arms 58 are employed in accordance with the present invention, only one of which is shown in FIG. 1, wherein the pivot arms 58 are disposed parallel to each other on opposite sides of the discharge pulley 32 and drive pulley 34. It is possible, however, to provide only one such pivot arm 58.

One or more linear actuators 60, each preferably in the form of a cylinder-and-piston arrangement, are preferably provided to actuate the pivotal motion of pivot arm or arms 58. For each linear actuator 60, a casing 62 preferably houses a linearly extendable and retractable piston rod 64. Each linear actuator 60 is preferably fixed to main frame 24 and preferably oriented so as to best facilitate the pivotal motion of pivot arm 58. It should be understood that, in accordance with the present invention, it is possible to provide only one linear actuator 60 to drive two parallel pivot arms 58, in that the two pivot arms 58 may be connected by a common rod, which rod may in turn be connected to piston rod 64 in the manner of a pivot connection. Of course, two linear actuators 60 may be used to drive each of two pivot arms 58, and, if only one pivot arm 58 is to be utilized, only one linear actuator 60 need be used.

Each piston rod 64 is preferably connected to a rearward end of a pivot arm 58, that is, the end of a pivot arm 58 disposed away from discharge pulley 32, by means of a pivot connection 66. Each pivot connection 66 is preferably constructed such that, as piston rod 64 undergoes linear retraction or extension, the pivot arm 58 will undergo pivotal motion in response thereto without necessitating any motion of the linear actuator 60 other than the extension or retraction of piston rod 64. In other words, as piston rod 64 extends or retracts to effect pivotal motion of pivot arm 58, casing 62 of linear actuator 60 remains substantially stationary. Thus, by means of linear actuator 60, it is possible to adjust the angle of discharge of material from the centrifugal thrower. One type of linear actuator which may be used in accordance with the present invention is the Andco Model 7324TX actuator, having the following characteristics: 36" stroke, dust ignition proof, Class 2, Group 8, F and 11, 600 volt, 3-phase.

Preferably, each pivot arm 58 has an interior channel to slidably accommodate the discharge pulley frame 40 therewithin, such that the discharge pulley frame 40 may undergo linear motion along a longitudinal axis 68 defined through the pivot arm 58. A shaft 70 is preferably provided at a forward end of discharge pulley frame 40, that is, at the end disposed towards discharge pulley 32, whereupon discharge pulley 32 is preferably rotatably mounted.

Fixably mounted on frame 24 is a cam 72 having a shape which, in the manner to be described below, ensures constant or substantially constant tension on the belt 36. Here, also, it should be understood that, preferably, two cams 72 are employed in accordance with the present invention, only one of which is shown in FIG. 1, wherein the cams 72 are disposed parallel to each other on opposite sides of the frame 24. It is possible, however, to provide only one such cam 72, especially if only one pivot arm 58 is being employed.

A cam follower 74, configured to roll along an outer cam surface 76 of each cam 72, is preferably rotatably mounted at a rear end of discharge pulley frame 40, that is, at the end of discharge pulley frame 40 closer to pivot point 56, on each side of discharge pulley 32.

Preferably, each cam follower 74 is configured to follow each outer cam surface 76 as pivot arm 58 undergoes pivotal motion. Essentially, cam follower or followers 74 can be biased towards the surface of cam 72 by the tension of the belt 36. Accordingly, as the pivot arm 58 undergoes pivotal motion in response to the motion of linear actuator 60, cam follower or followers 74 respond to the changing contour of the surface of cam or cams 72 and remains engaged therewith to cause discharge pulley frame 40 to undergo linear displacement. Preferably, the belt 36 is pretensioned by means of adjusting blocks described further below, thus providing for the biasing of cam follower or followers 74 and discharge pulley frame 40 towards cam surface 76. Possibly, a spring arrangement, such as one or more compression springs, or other auxiliary biasing arrangement may be provided as a sole means for biasing the cam follower or followers 74 and discharge pulley frame 40 towards cam surface 36 or as a means for supplementing the biasing effect provided by the belt 36.

Thus, at this juncture, the functioning of a centrifugal thrower apparatus according to the present invention should be clear in that each cam 72 is preferably shaped such that, as cam followers 74 bias the discharge pulley frame 40 towards cam or cams 72, discharge pulley frame 40 is displaced by an amount and in a direction which ensures that the tension on belt 36 remains constant or substantially constant during the pivotal motion of pivot arm or arms 58, throughout a range of angles of discharge of material from the belt 36. It will be appreciated that, because of the capability of the maintenance of constant belt tension, substantially large changes in angle of throw are attainable.

Possibly, a centrifugal thrower apparatus according to the present invention may be configured such that drive pulley 34, as well as discharge pulley 32, is supported on a floating frame. In such a case, both discharge pulley 32 and drive pulley 34 could be supported by the same floating frame, or they could each be supported on separate floating frames. Such an alternative, if adopted in conjunction with the use of a cam or cams 72 in a manner similar to that described above, may also provide for the maintenance of constant belt tension over a wide range of angles of discharge. An example of a floating frame which carries two drums can be found in U.S. Pat. No. 4,144,962 to Ide. As disclosed therein, two drums 20 and 22, carrying a belt 24, are mounted on a carriage 18. The carriage 18 is displaced in a rocking motion about idler discs 28 by means of a crank arm 72 connected to a forward portion of the carriage and by a crank and pivot arrangement 40, 42 at a rearward portion of the carriage. The drums 20 and 22 are each supported by journals 64 and 66, respectively, which in turn are adjustable, prior to operation, within adjustment channels 68 and 70, respectively. As disclosed, the carriage 18, with drums 20, 22, moves as a single, integrated unit about the idler discs. Thus, in accordance with the present invention, as an example, a secondary floating frame, akin to discharge pulley frame 40 disclosed herein, could be provided within the structure of a greater carriage such as that disclosed by Ide. In turn, such a secondary floating frame could be engageable with a cam to ensure constant belt tension.

In a preferred embodiment of the present invention, each cam 72 is configured such that constant belt tension is maintained over a range of angles of discharge ranging from about $-30°$ to about $+30°$ with respect to a horizontal axis of the frame 24, i.e. an axis perpendicular to the vertical axis 30. For example, FIG. 1 shows the thrower apparatus of the present invention configured for an angle of throw of $-30°$ with respect to the horizontal. It can be appreciated from FIG. 1 that, in such a configuration, the cam surface 76 of a cam 72 is configured such that the discharge pulley frame 40 is disposed to prevent undue slackening of belt 36. More particularly, as shown in FIG. 1, discharge pulley frame 40 is pushed somewhat outwardly, that is, away from cam or cams 72, in order to provide enough tension to the belt to prevent a slackening of the belt 36, which may otherwise occur at such a low angle of discharge of the thrower apparatus. Consequently, a belt tension substantially equal to that exhibited at other angles of discharge of the thrower apparatus is maintained.

Figure 2:
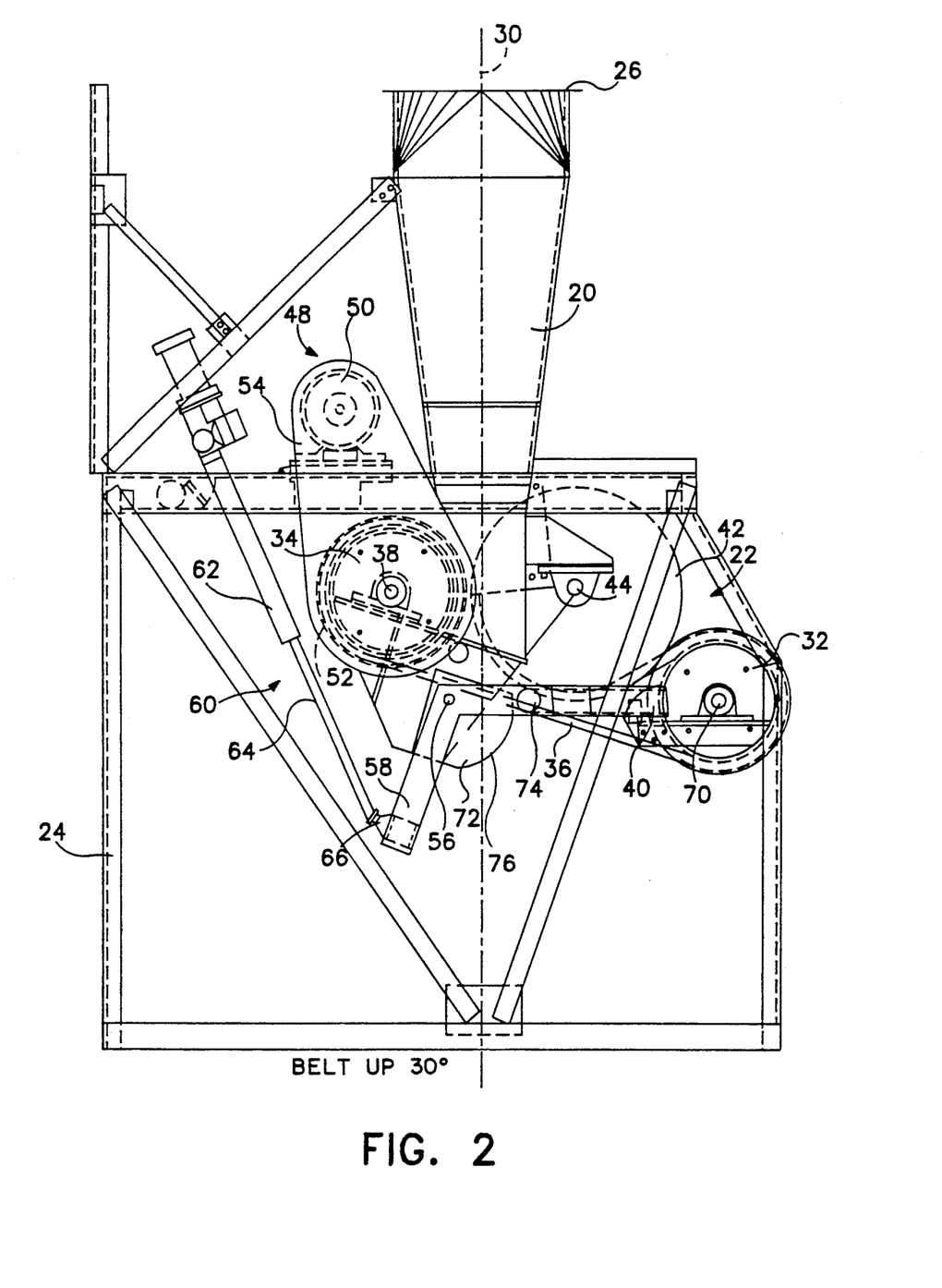
FIG. 2 is substantially the same view as FIG. 1, but with the belt of the thrower apparatus being oriented in a higher position.

In contrast, FIG. 2 shows the thrower apparatus of the present invention configured for an angle of discharge of +30° with respect to the horizontal. It can be appreciated from FIG. 2 that, in such a configuration, the cam surface 76 of each cam 72 is configured such that the discharge pulley frame 40 is disposed to prevent excessive tensioning of belt 36. More particularly, as shown in FIG. 2, discharge pulley frame 40 is biased somewhat inwardly, that is, towards cam 72, in order to compensate for the excessive tension on the belt 36 which, due to the wrapping of the belt 36 about idler discs 42, may otherwise occur at such a high angle of discharge of the thrower apparatus. Consequently, here also, a belt tension substantially equal to that exhibited at other angles of discharge of the thrower apparatus is maintained. Thus, by virtue of the present invention, substantially the same tension is maintained on the belt 36 for the substantially different angles of discharge shown in FIGS. 1 and 2. Furthermore, the cam surface 76 of each cam 72 is shaped such that substantially the same tension is maintained on the belt 36 for all angles of discharge intermediate to those shown in FIGS. 1 and 2.

Figure 3:
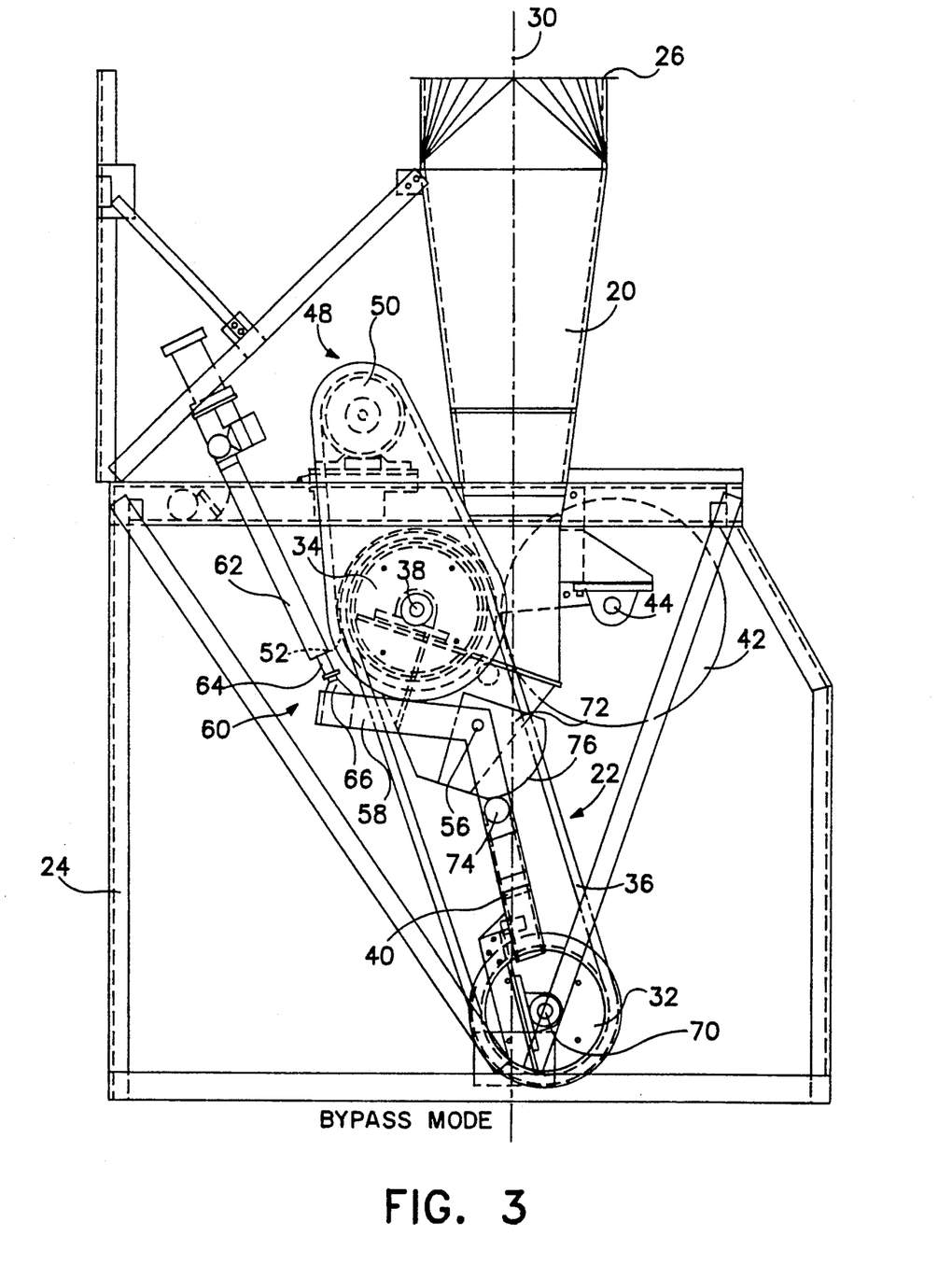
FIG. 3 is substantially the same view as FIGS. 1 and 2, but showing the thrower apparatus in a "bypass configuration"

In a further refinement of the present invention, the thrower apparatus can additionally be positioned in a "bypass configuration". Particularly, the present invention can allow for the pivot arm 58 to be positioned substantially downwardly to allow material entering from the chute 20 to essentially bypass the belt 36 and thus essentially avoid being thrown outwardly into the cargo hold or container. FIG. 3 shows the thrower apparatus positioned in such a "bypass configuration". In such a position, the linear actuator or actuators 60 may be fully retracted so that the discharge pulley 32 is positioned to orient the belt at a substantial angle below the horizontal, such as greater than about 75°. Also, in such a position, the belt 36 preferably only barely contacts the idler discs 42, if at all. Thus, advantageously, the cam surface 76 of each cam 72 may be shaped to provide an even further outward extension of the discharge pulley frame 40, not only to prevent the slackening which may otherwise be exhibited in such a position but to compensate for the lack of belt tension normally provided by the engagement of the idler discs 42 with the belt 36. Thus, by virtue of the "bypass configuration" shown in FIG. 3, it is possible to move the belt 36, while being driven, sufficiently downward to allow material entering from chute 20 to be delivered directly, substantially downwardly, into the container or cargo hold. Therefore, in essence, a thrower apparatus configured in accordance with the present invention substantially obviates the need for a bypass chute and also permits the belt 36 to be continually running while in the "bypass configuration", thus avoiding the operating costs associated with more frequent stopping and starting of the belt 36.

In order to provide a cam 72 suitable for use in accordance with the present invention, the shape of the cam surface 76 thereof can possibly be calculated mathematically, on the basis of the geometric configurations exhibited by the supplementary components. Alternatively, the shape of each cam surface 76 can be determined empirically, by measuring the tension on the belt 36 for various angles of discharge and altering the cam surface 76, by a method such as grinding, in order to optimally configure the cam surface 76 for use in accordance with the present invention.

Figure 4:
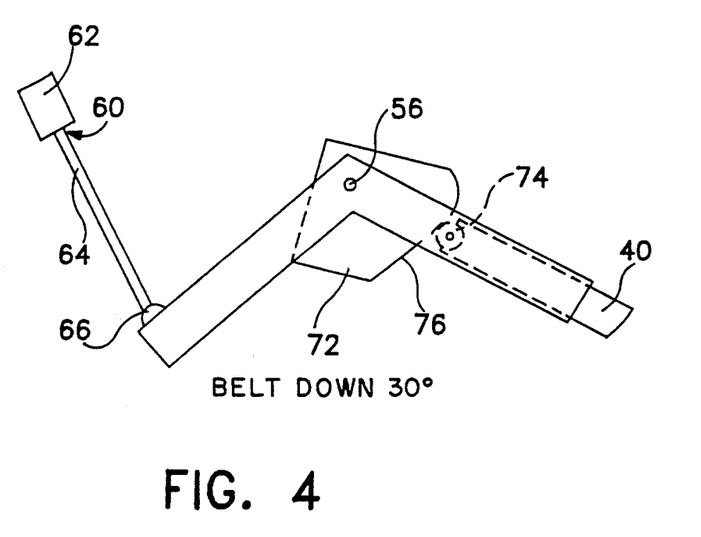
FIG. 4 is a larger scale, side elevational view of a cam structure in accordance with the present invention, wherein the thrower apparatus is oriented in the lower position of FIG. 1.
Figure 5:
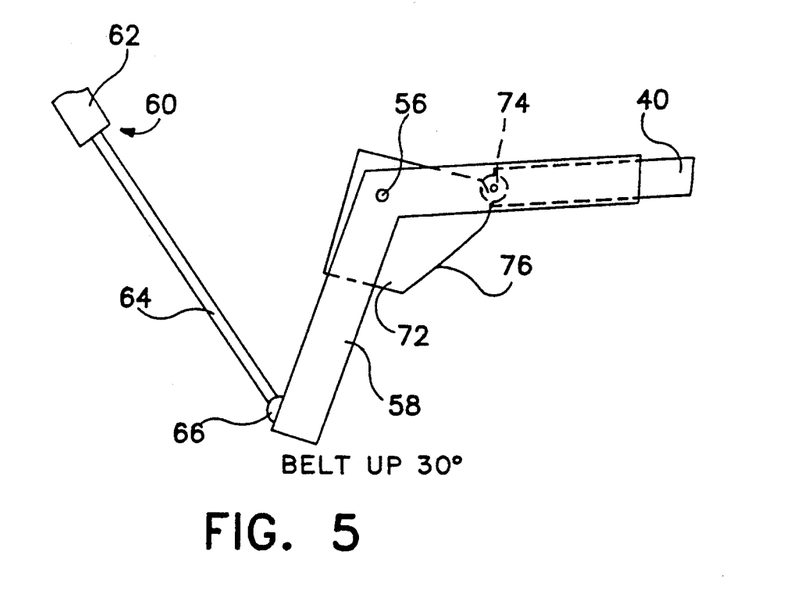
FIG. 5 is substantially the same view as FIG. 4, but wherein the thrower apparatus is oriented in the higher position of FIG. 2.
Figure 6:
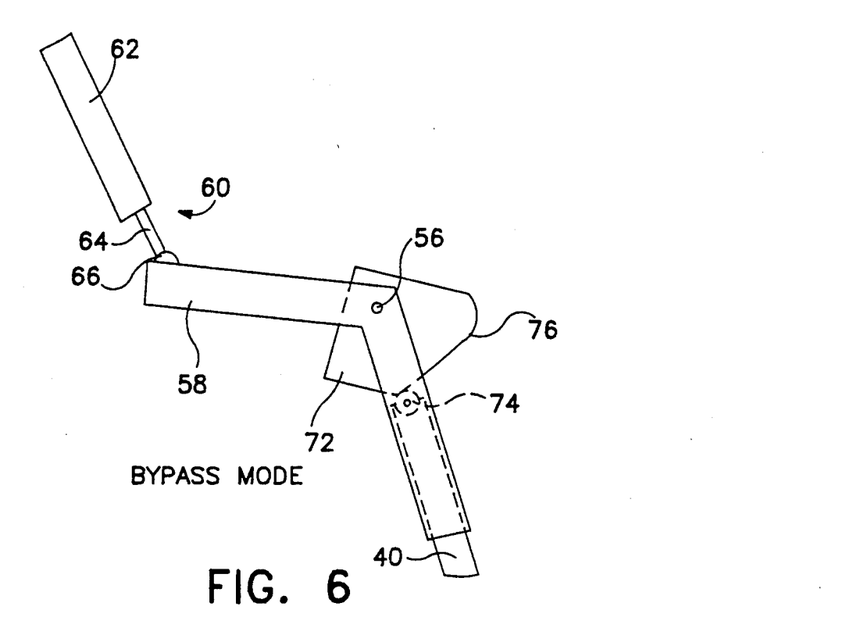
FIG. 6 is substantially the same view as FIGS. 4 and 5, but wherein the thrower apparatus is oriented in the "bypass configuration" of FIG. 3.

FIGS. 4, 5 and 6 show a larger scale representation of a cam 72, pivot arm 58 and linear actuator 60. Particularly, FIG. 4 shows the orientation of a pivot arm 58 when the thrower belt 36 is in the "30° down" position, i.e. the position illustrated by FIG. 1.

FIG. 5 shows the orientation of a pivot arm 58 when the thrower belt 36 is in the "30° up" position, i.e. the position illustrated by FIG. 2.

FIG. 6 shows the orientation of a pivot arm 58 when the thrower belt 36 is in the "bypass" configuration, i.e. the position illustrated by FIG. 3.

It will be appreciated from FIGS. 1 through 6 that a centrifugal thrower apparatus according to the present invention could be configured for even greater angles of discharge, both above and below the horizontal axis, than illustrated by the drawings. For example, pivot arm or arms 58 and discharge pulley frame 40, along with belt 36, could be lengthened in order to allow for even greater belt wrap about idler discs 42. In accordance with such an alternative, pivot arm 58 could be disposed further outwardly from idler discs 42 in order to avoid contact between pivot arm 58 and idler discs 42. Additionally, further in accordance with such an alternative, the sizes of the pulleys and discs could be appropriately altered to allow for angles of discharge greater than 30° above the horizontal. Thus, in such a manner, angles of discharge of up to 45°, 50°, 60°, and possibly even 70° above the horizontal could be attained. In a similar manner, with substantially similar modifications, angles of discharge lower than −30°, such as −40°, −50°, −60° or −70° with respect to the horizontal could be permitted. In either case, cam surface or surfaces 76 could be appropriately shaped to ensure constant belt tension for the desired angles of discharge.

Figure 7:
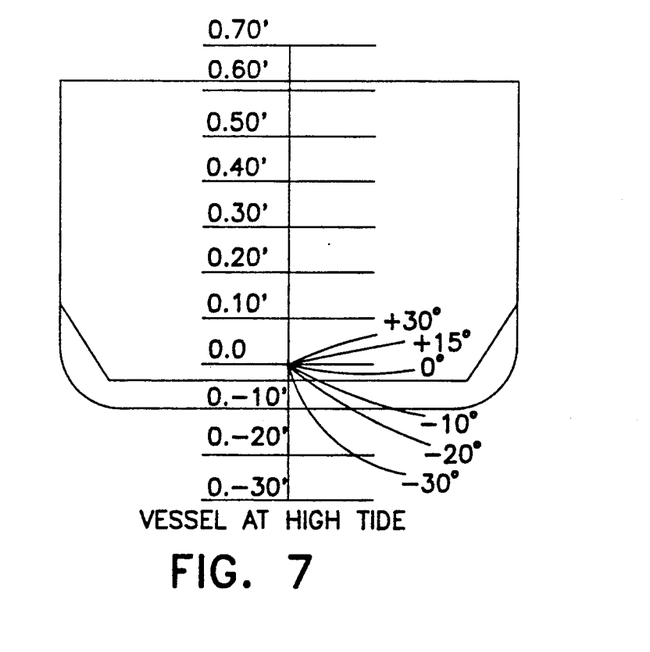
FIG. 7 is a schematic illustration of the trajectories of throw afforded by the present invention in the cargo hold of an ocean-going vessel at high tide.
Figure 8:
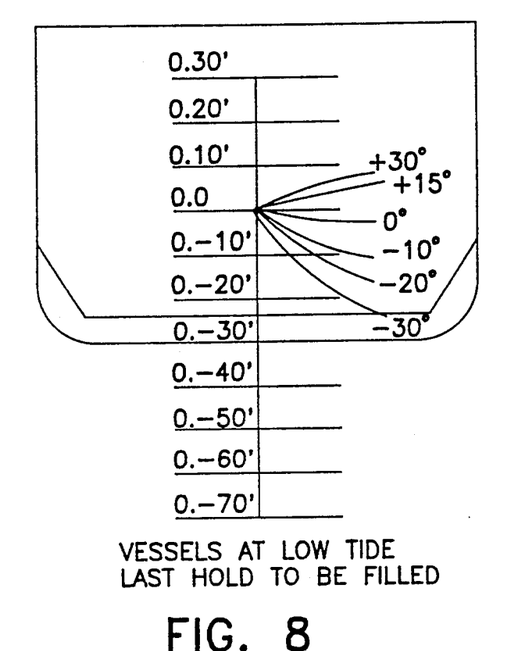
FIG. 8 is a schematic illustration of the trajectories of throw afforded by the present invention in the cargo hold of an ocean-going vessel at low tide.
Figure 9:
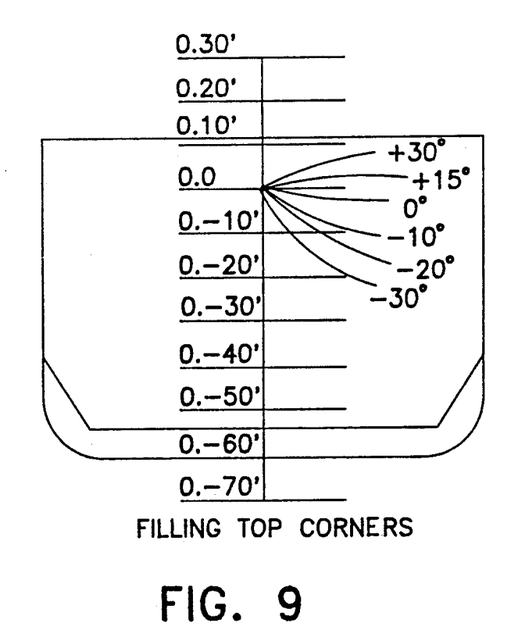
FIG. 9 is another schematic illustration of the trajectories of throw afforded by the present invention in the cargo hold of an ocean-going vessel.

The practical versatility afforded by a thrower apparatus according to the present invention is exemplified by FIGS. 7, 8 and 9. Particularly, FIG. 7 is a schematic illustration of some possible trajectories exhibited by the thrower apparatus of the present invention when used as a ship trimmer in a cargo hold of an ocean-going vessel at high tide. Similarly, FIG. 8 is a schematic illustration of some possible trajectories exhibited by the thrower apparatus of the present invention in a cargo hold, particularly the last cargo hold to be filled, of an ocean-going vessel at low tide. Finally, FIG. 9 illustrates some possible trajectories exhibited by the thrower apparatus of the present invention in filling the top corners of a cargo hold of an ocean-going vessel. Thus, as can be divined from FIGS. 7, 8 and 9, the present invention can be applied to a variety of contexts and can allow for the thorough, efficient delivery of material in each of those contexts over a wide range of angles of discharge.

Figure 10:
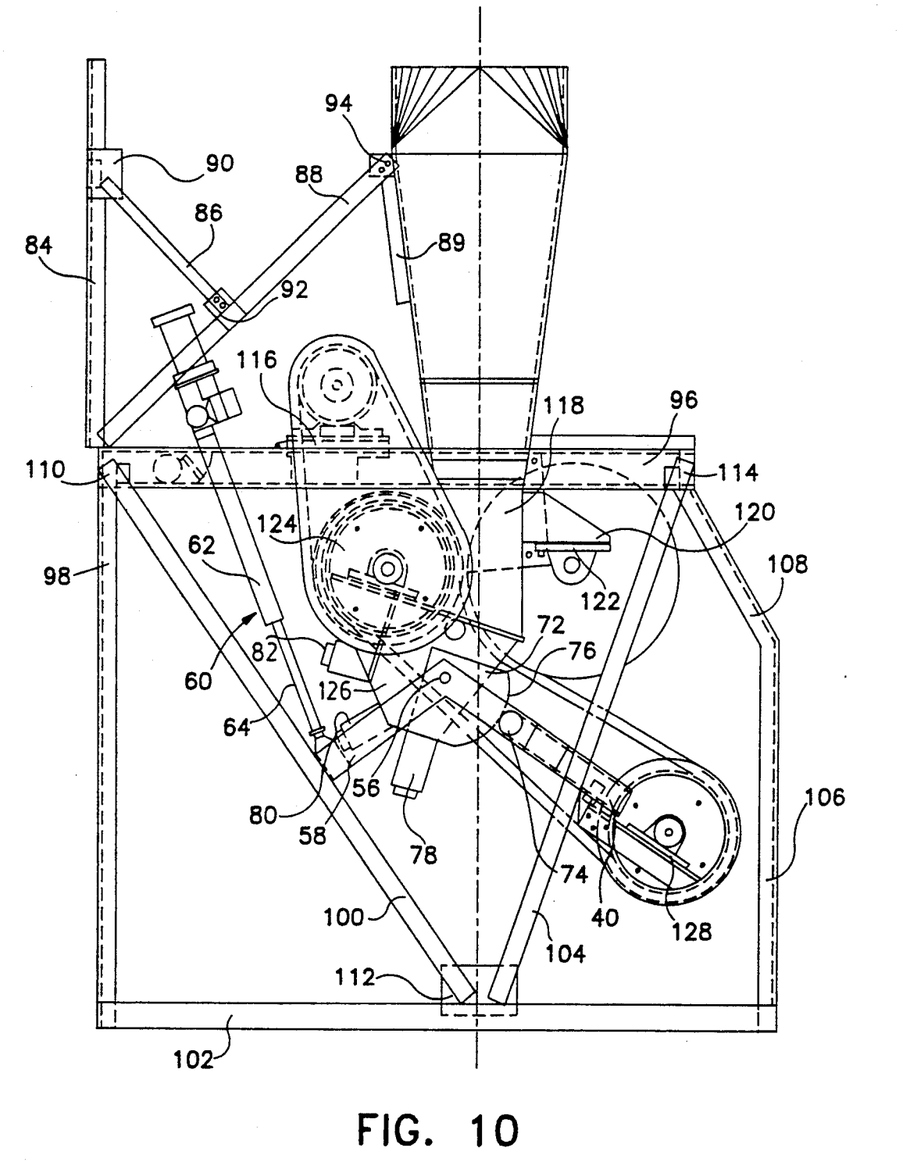
FIG. 10 is substantially the same view as FIG. 1, but referencing several additional components of a centrifugal thrower apparatus according to the present invention.

FIG. 10 shows several other components which may be included in a centrifugal thrower apparatus according to the present invention. Preferably, three limit switches 78, 80 and 82 are provided to correspond, respectively, with the "bypass" position, the "30° down" position and the "30° up" position of pivot arm 58. Particularly, a first limit switch 78, corresponding to the "bypass" position, preferably extends outwardly from the vicinity of cam 72 in a direction generally parallel to the pivot arm 58 when the pivot arm 58 is in the "bypass" position. Thus, limit switch 78 is preferably configured such that, when pivot arm 58 is undergoing pivotal displacement and arrives at the "bypass" position, the limit switch 78 is tripped to cause the linear actuator or actuators 60 to cease the pivotal movement of pivot arm 58.

Preferably, limit switches 80 and 82 operate similarly to limit switch 78. Accordingly, limit switch 80, extending from a support frame described further below, preferably extends in a direction generally parallel to a pivot arm 58 when, as shown in FIG. 10, a pivot arm 58 is in the "30° down" position. Limit switch 82, also extending from the support frame described further below, preferably extends in a direction generally parallel to a pivot arm 58 when the pivot arm is in the "30° up" position. An example of a type of limit switch which may be utilized in accordance with the present invention is an "802X" type limit switch.

FIG. 10 illustrates a possible embodiment of the frame 24. Particularly, in an upper portion of the centrifugal thrower apparatus, as shown, braces 84, 86, 88 and 89 may be provided to support chute 20, wherein: 84 represents vertical braces opposite the chute 20; 88 represents a diagonal brace or braces extending between the foot of brace 84 and an upper portion of the chute 20; 86 is a diagonal connecting brace extending between an upper portion of vertical braces 84 and a central portion of diagonal braces 88; and 89 is a set of braces disposed along the surface of chute 20, initiating at the diagonal braces 88 and extending downwardly along the chute 20 therefrom. A connector 90 may be provided to join braces 84 and 86, a connector 92 may be provided for connecting braces 86 and 88, and another connector 94 may be provided for connecting braces 88 and 89.

The frame 24 may include a horizontal platform 96 for supporting chute 20 and/or motor 50. Below platform 96, supports 98, 100, 102, 104, 106 and 108 may be provided, wherein: 98 represents vertical supports generally directly below braces 84; 102 is a horizontal base support at a lower portion of frame 24; 100 represents diagonal supports extending from an upper portion of support 98 to an intermediate point along base 102, preferably generally in the area where vertical axis 30 intersects base 102; 104 represents diagonal supports extending from the general area where base 102 and support 100 intersect to a forward portion of platform 96, i.e. a portion of platform 96 opposite supports 98; 106 represents vertical supports extending upwardly from a forward portion of base 102; and 108 is a set of diagonal supports extending between an upper portion of supports 106 and the forward portion of platform 96. In addition, a suitable connector 110 may be provided for connecting supports 98 and 100 and platform 96, another connector 112 may be provided to connect supports 100 and 104 and base 102, and yet another connector 114 may be provided to connect supports 104 and 108 and platform 96.

Preferably, a support block 116 is provided on platform 96 for supporting motor 50. A bracket or other appropriate support 118 preferably extends downwardly from a central portion of platform 96 to support another support 120 protruding forwardly therefrom, which, in turn, preferably, supports a pillow block bearing 122 for carrying shaft 44 of idler discs 42. Another pillow block bearing 124, for carrying shaft 38 of drive pulley 34, is also preferably supportively connected with support 118.

Preferably supported by bracket 118, and extending downwardly therefrom, is a mounting bracket 126 on which to mount cam 72. Finally, a pillow block bearing 128 is preferably provided for carrying shaft 70 of discharge pulley 32. Preferably disposed in the vicinity of pillow block bearing 128 are adjusting blocks (not shown), by means of which the belt 36 can be pre-tensioned. Such adjusting blocks are well-known to those of ordinary skill in the art and shall thus not be described in further detail here.

Figure 11:
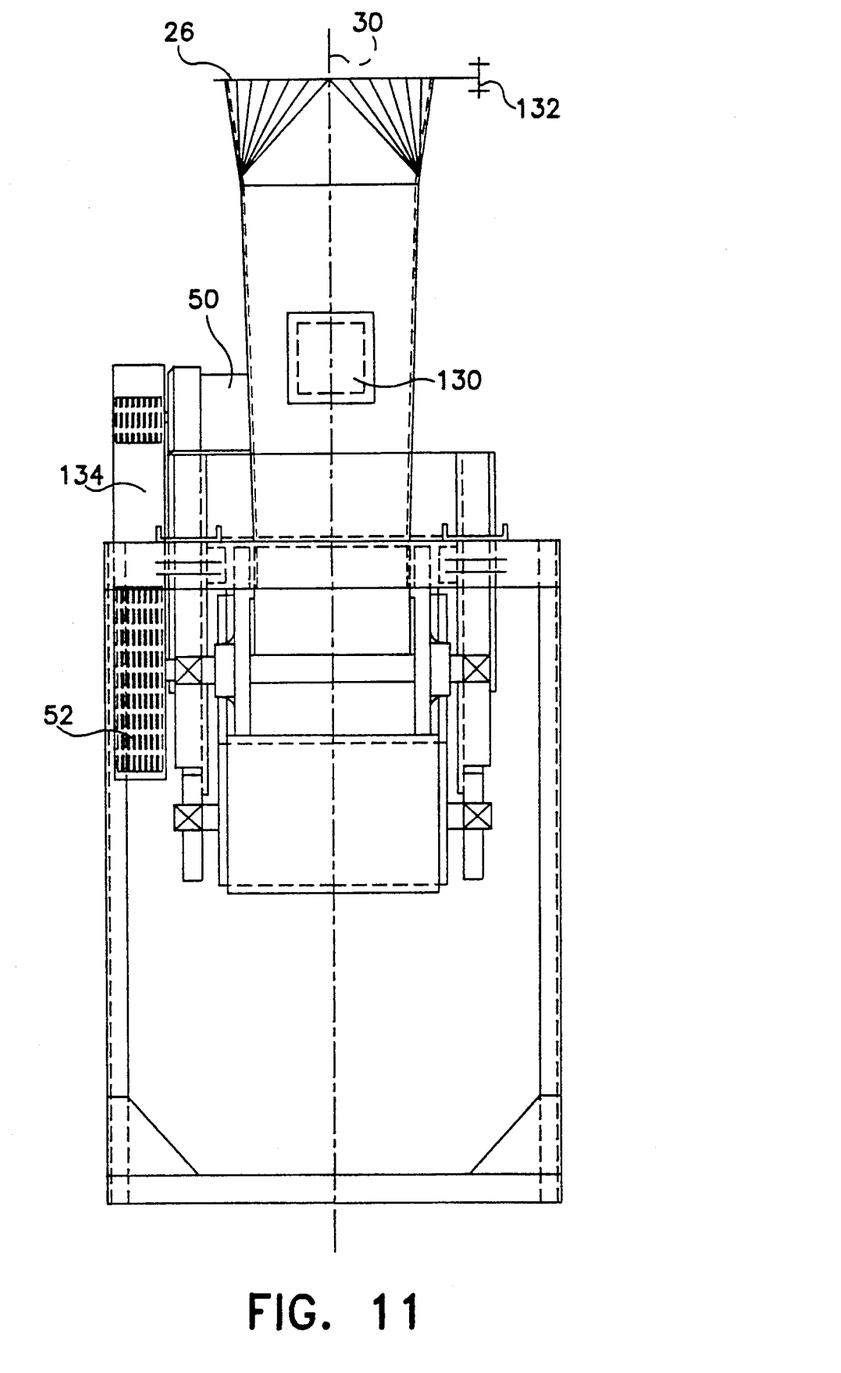
FIG. 11 is a front elevational view of a centrifugal thrower apparatus according to the present invention.

FIG. 11 is a front elevational view of a centrifugal thrower apparatus according to the present invention. As shown, a hatch 130, disposed generally midway along the vertical extent of chute 20, may be provided for affording access to the interior of chute 20. A limit switch bracket 132, for mounting an additional limit switch, may extend from the upper portion 26 of chute 20. Finally, a cover 134 may be provided to cover and protect the sheave and shafts associated with motor 50.

One cycle of operation of a thrower apparatus according to the present invention may now be illustrated with reference to the drawings. First, with the linear actuator 60 fully retracted, as in FIG. 3, the discharge pulley 32 is extended substantially outwardly, in a "maximum down" position, and the belt 36 barely contacts the idler discs 42. By means of the adjusting blocks behind discharge pulley pillow block bearing 128, the belt 36 may be pre-tensioned. Thence, during operation, as the linear actuator 60 extends, the pivot arm or arms 58 pivot to raise the discharge pulley 32. Thus, belt 36 begins to wrap about the idler discs 42.

It will be appreciated that, if the belt wrap about the idler discs were to remain unchecked, the tension on the belt 36 would increase dramatically. However, the cam 72 and the cam follower 74 allow the discharge pulley frame 40, along with the discharge pulley 32, to be displaced inwardly, towards cam 72 along pivot arm 58, an amount appropriate for maintaining substantially constant tension on the belt 36. The continual adjustment of the position of the discharge pulley frame 40 to maintain constant belt tension occurs throughout the continual pivotal movement of pivot arm 58.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Centrifugal thrower apparatus for delivering loose material, said centrifugal thrower apparatus including frame means and chute means mounted on said frame means, said centrifugal thrower apparatus comprising:
   first pulley means being rotatably mounted on said frame means;
   second pulley means;
   means for supporting said second pulley means, said second pulley means being rotatably mounted on said means for supporting said second pulley means;

said means for supporting said second pulley means being displaceably mounted on said frame means;

means for solely displacing said means for supporting said second pulley means;

belt means being mounted between said first pulley means and said second pulley means;

means for driving said belt means;

said belt means for receiving material from said chute means and discharging the material in the vicinity of said second pulley means;

said means for supporting said second pulley means being displaceable to discharge the delivered material from said belt means at a plurality of angles; and means for maintaining constant tension on said belt means over a plurality of angles of discharge.

2. The centrifugal thrower apparatus according to claim 1, further comprising said means for maintaining constant belt tension on said belt means being for maintaining constant belt tension on said belt means over a plurality of substantially different angles of discharge.

3. The centrifugal thrower apparatus according to claim 2, wherein said means for maintaining constant tension on said belt means comprises:
cam follower means being connected to said means for supporting said second pulley means; and
cam means for engaging said cam follower means, said cam means being configured for maintaining constant belt tension on said belt means over a plurality of substantially different angles of discharge.

4. The centrifugal thrower apparatus according to claim 3, further comprising:
means for supporting said first pulley means, said first pulley means being rotatably mounted on said means for supporting said first pulley means; and
said means for supporting said first pulley means being fixed with respect to said frame means.

5. The centrifugal thrower apparatus according to claim 4, further comprising:
said means for supporting said second pulley means having a longitudinal axis defined therethrough and through said cam means and said second pulley means;
said cam follower means being biased towards said cam means by said belt means; and
at least a portion of said means for supporting said second pulley means being displaceable along the longitudinal axis thereof in response to the biasing of said cam follower means towards said belt means.

6. The centrifugal thrower apparatus according to claim 5, further comprising:
a vertical axis of said centrifugal thrower apparatus being defined through and generally parallel to said chute means;
a horizontal axis of said centrifugal thrower apparatus being defined generally perpendicular to the vertical axis and generally parallel to said first pulley means and said second pulley means; and
said cam means being configured for maintaining constant tension on said belt means over a range of angles of discharge between about −30° and about 30° with respect to the horizontal axis.

7. The centrifugal thrower apparatus according to claim 6, further comprising:
said means for supporting said second pulley means comprising at least one pivot arm and a floating frame, said floating frame being slidably engaged with said pivot arm;
said floating frame being slidably displaceable with respect to said pivot arm in response to the biasing of said cam follower means towards said cam means;
means for supporting said at least one pivot arm;
each said at least one pivot arm being mounted on said frame means for pivotal movement about said means for supporting said at least one pivot arm;
said means for displacing said means for supporting said second pulley means comprising linear actuator means;
said linear actuator means comprising at least one casing and at least one piston rod, each said at least one piston rod being slidably displaceable within one of said at least one casing;
said at least one piston rod being pivotally connected to said at least one pivot arm and being for pivotally displacing said at least one pivot arm to discharge the delivered material from said belt means at a plurality of angles of discharge with respect to the horizontal axis;
said cam means being configured for maintaining constant tension on said belt means during the pivotal displacement of said pivot arm;
each said at least one casing of said linear actuator means being positionally fixed with respect to said frame means;
said pivot arm comprising a dogleg shape, the dogleg shape having an elbow portion at said means for supporting at least one pivot arm, the elbow portion of the dogleg shape defining an obtuse angle;
said pivot arm being positionable a bypass position, the material for being delivered substantially directly downwardly while said pivot arm is in the bypass position;
limit switch means being disposed adjacent said pivot arm;
a first of said limit switch means for detecting the displacement of said pivot arm into the bypass position and thence ceasing the displacement of said pivot arm;
a second of said limit switch means for detecting the displacement of said pivot arm into a position wherein the angle of discharge is −30° with respect to the horizontal axis and thence ceasing the displacement of said pivot arm; and
a third of said limit switch means for detecting the displacement of said pivot arm into a position wherein the angle of discharge is 30° with respect to the horizontal axis and thence ceasing the displacement of said pivot arm.

8. Centrifugal thrower apparatus for delivering loose material, said centrifugal thrower apparatus including frame means and chute means mounted on said frame means, said centrifugal thrower apparatus comprising:
first pulley means;
second pulley means;
means for supporting said first pulley means, said first pulley means being rotatably mounted on said means for supporting said first pulley means;
means for supporting said second pulley means, said second pulley means being rotatably mounted on said means for supporting said second pulley means;

belt means being mounted between said first pulley means and said second pulley means;

means for driving said belt means;

said belt means for receiving material from the chute means and discharging the material in the vicinity of said second pulley means;

means for displacing at least one of:
said means for supporting said first pulley means; and
said means for supporting said second pulley means;

said at least one of said means for supporting said first pulley means and said means for supporting said second pulley means being displaceable to define an angle of discharge of the delivered material from said belt means;

cam follower means being connected to said at least one of said means for supporting said first pulley means and said means for supporting said second pulley means; and cam means for engaging said cam follower means, said cam means being configured for maintaining substantially constant tension on said belt means over a plurality of angles of discharge.

9. The centrifugal thrower apparatus according to claim 8, further comprising said cam means being configured for maintaining substantially constant belt tension on said belt means over a plurality of substantially different angles of discharge.

10. The centrifugal thrower apparatus according to claim 9, further comprising said cam means being configured for maintaining constant belt tension on said belt means over a plurality of substantially different angles of discharge.

11. The centrifugal thrower apparatus according to claim 10, further comprising:
said means for displacing at least one of said means for supporting said first pulley means and said means for supporting said second pulley means being for solely displacing said means for supporting said second pulley means.

12. The centrifugal thrower apparatus according to claim 11, wherein said means for supporting said first pulley means is fixed with respect to said frame means.

13. The centrifugal thrower apparatus according to claim 12, further comprising:
said means for supporting said second pulley means having a longitudinal axis defined therethrough and through said cam means and said second pulley means;
said cam follower means being biased towards said cam means by said belt means; and
at least a portion of said means for supporting said second pulley means being displaceable along the longitudinal axis thereof in response to the biasing of said cam follower means towards said belt means.

14. The centrifugal thrower apparatus according to claim 13, further comprising:
a vertical axis of said centrifugal thrower apparatus being defined through and generally parallel to said chute means;
a horizontal axis of said centrifugal thrower apparatus being defined generally perpendicular to the vertical axis and generally parallel to said first pulley means and said second pulley means;
said cam means being configured for maintaining constant tension on said belt means over a range of angles of discharge between about −30° and about 30° with respect to the horizontal axis;
said means for supporting said second pulley means comprising at least one pivot arm and a floating frame, said floating frame being slidably engaged with said pivot arm;
said floating frame being slidably displaceable with respect to said pivot arm in response to the biasing of said cam follower means towards said cam means;
means for supporting said at least one pivot arm;
each said at least one pivot arm being mounted on said frame means for pivotal movement about said means for supporting said at least one pivot arm;
said means for displacing said means for supporting said second pulley means comprising linear actuator means;
said linear actuator means comprising at least one casing and at least one piston rod, each said at least one piston rod being slidably displaceable within one of said at least one casing;
said at least one piston rod being pivotally connected to said at least one pivot arm and being for pivotally displacing said at least one pivot arm to discharge the delivered material from said belt means at a plurality of angles of discharge with respect to the horizontal axis;
said cam means being configured for maintaining constant tension on said belt means during the pivotal displacement of said pivot arm;
each said at least one casing of said linear actuator means being positionally fixed with respect to said frame means;
said pivot arm comprising a dogleg shape, the dogleg shape having an elbow portion at said means for supporting at least one pivot arm, the elbow portion of the dogleg shape defining an obtuse angle;
said pivot arm being positionable a bypass position, the material for being delivered substantially directly downwardly while said pivot arm is in the bypass position;
limit switch means being disposed adjacent said pivot arm;
a first of said limit switch means for detecting the displacement of said pivot arm into the bypass position and thence ceasing the displacement of said pivot arm;
a second of said limit switch means for detecting the displacement of said pivot arm into a position wherein the angle of discharge is −30° with respect to the horizontal axis and thence ceasing the displacement of said pivot arm; and
a third of said limit switch means for detecting the displacement of said pivot arm into a position wherein the angle of discharge is 30° with respect to the horizontal axis and thence ceasing the displacement of said pivot arm.

15. Centrifugal thrower apparatus for delivering loose material, said centrifugal thrower apparatus including frame means and chute means mounted on said frame means, said centrifugal thrower apparatus comprising:
first pulley means being rotatably mounted on said frame means;
second pulley means;
means for supporting said second pulley means, said second pulley means being rotatably mounted on said means for supporting said second pulley means;

said means for supporting said second pulley means being displaceably mounted on said frame means;

means for displacing said means for supporting said second pulley means;

belt means being mounted between said first pulley means and said second pulley mean;

means for driving said belt means;

said belt means for receiving material from said chute means and discharging the material in the vicinity of said second pulley means;

said means for supporting said second pulley means being displaceable to discharge the delivered material from said belt means at a plurality of angles; and means for maintaining constant tension on said belt means over a plurality of substantially different angles of discharge.

16. The centrifugal thrower apparatus according to claim 15, wherein said means for displacing said means for supporting said second pulley means is for solely displacing said means for supporting said second pulley means.

17. The centrifugal thrower apparatus according to claim 16, wherein said means for maintaining constant tension on said belt means comprises:

cam follower means being connected to said means for supporting said second pulley means; and cam means for engaging said cam follower means, said cam means being configured for maintaining constant belt tension on said belt means over a plurality of substantially different angles of discharge.

18. The centrifugal thrower apparatus according to claim 17, further comprising:

means for supporting said first pulley means, said first pulley means being rotatably mounted on said means for supporting said first pulley means; and said means for supporting said first pulley means being fixed with respect to said frame means.

19. The centrifugal thrower apparatus according to claim 18, further comprising:

said means for supporting said second pulley means having a longitudinal axis defined therethrough and through said cam means and said second pulley means;

said cam follower means being biased towards said cam means by said belt means; and at least a portion of said means for supporting said second pulley means being displaceable along the longitudinal axis thereof in response to the biasing of said cam follower means towards said belt means.

20. The centrifugal thrower apparatus according to claim 19, further comprising:

a vertical axis of said centrifugal thrower apparatus being defined through and generally parallel to said chute means;

a horizontal axis of said centrifugal thrower apparatus being defined generally perpendicular to the vertical axis and generally parallel to said first pulley means and said second pulley means;

said cam means being configured for maintaining constant tension on said belt means over a range of angles of discharge between about $-30°$ and about $30°$ with respect to the horizontal axis;

said means for supporting said second pulley means comprising at least one pivot arm and a floating frame, said floating frame being slidably engaged with said pivot arm;

said floating frame being slidably displaceable with respect to said pivot arm in response to the biasing of said cam follower means towards said cam means;

means for supporting said at least one pivot arm;

each said at least one pivot arm being mounted on said frame means for pivotal movement about said means for supporting said at least one pivot arm;

said means for displacing said means for supporting said second pulley means comprising linear actuator means;

said linear actuator means comprising at least one casing and at least one piston rod, each said at least one piston rod being slidably displaceable within one of said at least one casing;

said at least one piston rod being pivotally connected to said at least one pivot arm and being for pivotally displacing said at least one pivot arm to discharge the delivered material from said belt means at a plurality of angles of discharge with respect to the horizontal axis;

said cam means being configured for maintaining constant tension on said belt means during the pivotal displacement of said pivot arm;

each said at least one casing of said linear actuator means being positionally fixed with respect to said frame means;

said pivot arm comprising a dogleg shape, the dogleg shape having an elbow portion at said means for supporting at least one pivot arm, the elbow portion of the dogleg shape defining an obtuse angle;

said pivot arm being positionable a bypass position, the material for being delivered substantially directly downwardly while said pivot arm is in the bypass position;

limit switch means being disposed adjacent said pivot arm;

a first of said limit switch means for detecting the displacement of said pivot arm into the bypass position and thence ceasing the displacement of said pivot arm;

a second of said limit switch means for detecting the displacement of said pivot arm into a position wherein the angle of discharge is $-30°$ with respect to the horizontal axis and thence ceasing the displacement of said pivot arm; and a third of said limit switch means for detecting the displacement of said pivot arm into a position wherein the angle of discharge is $30°$ with respect to the horizontal axis and thence ceasing the displacement of said pivot arm.

* * * * *